United States Patent
Jiang et al.

(10) Patent No.: US 9,736,287 B2
(45) Date of Patent: Aug. 15, 2017

(54) DETECTING AND SWITCHING BETWEEN NOISE REDUCTION MODES IN MULTI-MICROPHONE MOBILE DEVICES

(71) Applicant: Spreadtrum Communications (Shanghai) Co., Ltd., Shanghai (CN)

(72) Inventors: Bin Jiang, Shanghai (CN); Sheng Wu, Shanghai (CN); Fuhuei Lin, Shanghai (CN); Jingming Xu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/344,133

(22) PCT Filed: Feb. 25, 2013

(86) PCT No.: PCT/CN2013/071841
§ 371 (c)(1),
(2) Date: Mar. 11, 2014

(87) PCT Pub. No.: WO2014/127543
PCT Pub. Date: Aug. 28, 2014

(65) Prior Publication Data
US 2015/0350395 A1    Dec. 3, 2015

(51) Int. Cl.
*H04M 1/60* (2006.01)
*H04M 1/03* (2006.01)
(Continued)

(52) U.S. Cl.
CPC ............ *H04M 1/60* (2013.01); *H04B 1/0014* (2013.01); *H04M 1/03* (2013.01); *H04R 3/005* (2013.01);
(Continued)

(58) Field of Classification Search
None
See application file for complete search history.

(56) References Cited

U.S. PATENT DOCUMENTS 9,094,744 B1 * 7/2015 Lu .......................... H04R 3/002
2003/0147538 A1    8/2003 Elko
(Continued)

FOREIGN PATENT DOCUMENTS

| CN | 102300140 A | 12/2011 |
|---|---|---|
| CN | 102801861 A | 11/2012 |

(Continued)

OTHER PUBLICATIONS

International Search Report and the Written Opinion of the International Search Authority for International Application No. PCT/CN2013/071841; date of mailing Dec. 19, 2013.
(Continued)

*Primary Examiner* — Charles Appiah
*Assistant Examiner* — Margaret G Mastrodonato
(74) *Attorney, Agent, or Firm* — Cantor Colburn LLP

(57) ABSTRACT

A method of switching between noise reduction modes in multi-microphone mobile devices may include receiving a first sound signal at a first sound receiver and receiving a second sound signal at a second sound receiver. The method may also include determining a first power value associated with the first sound signal and determining a second power value associated with the second sound signal. The method may additionally include comparing the first power value to the second power value and switching between a single-microphone noise reduction mode and a dual-microphone noise reduction mode based on the comparison.

17 Claims, 8 Drawing Sheets

(51) Int. Cl.
*H04B 1/00* (2006.01)
*H04R 3/00* (2006.01)
*H04W 88/02* (2009.01)

(52) U.S. Cl.
CPC ...... *H04R 2410/05* (2013.01); *H04R 2499/11* (2013.01); *H04W 88/02* (2013.01)

(56) References Cited

U.S. PATENT DOCUMENTS

| | | |
|---|---|---|
| 2009/0190769 A1 | 7/2009 | Wang |
| 2009/0285409 A1* | 11/2009 | Yoshizawa ............ G01S 3/8083 381/92 |
| 2010/0081487 A1 | 4/2010 | Chen |
| 2011/0026730 A1 | 2/2011 | Li |
| 2011/0251845 A1* | 10/2011 | Arakawa ................ G10L 25/78 704/270 |

FOREIGN PATENT DOCUMENTS

| | | |
|---|---|---|
| WO | 2010/051509 A1 | 5/2010 |
| WO | 2013/009949 A1 | 1/2013 |

OTHER PUBLICATIONS

European Search Report for application No. 13184584.4, dated Mar. 2, 2014.

* cited by examiner

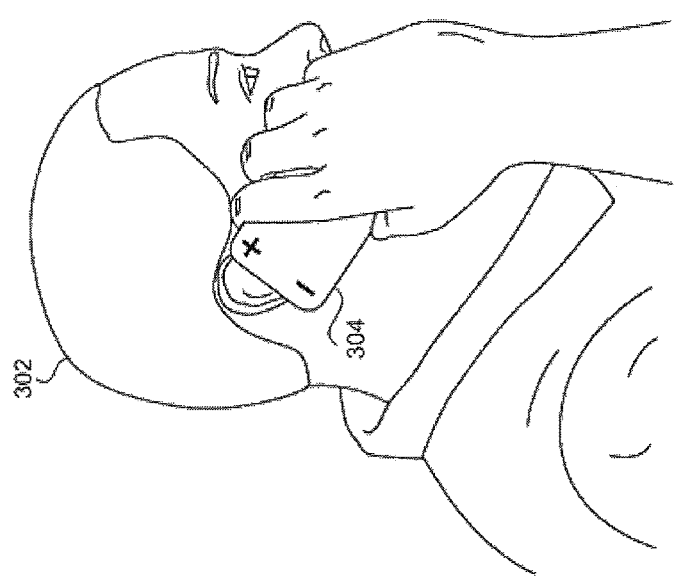

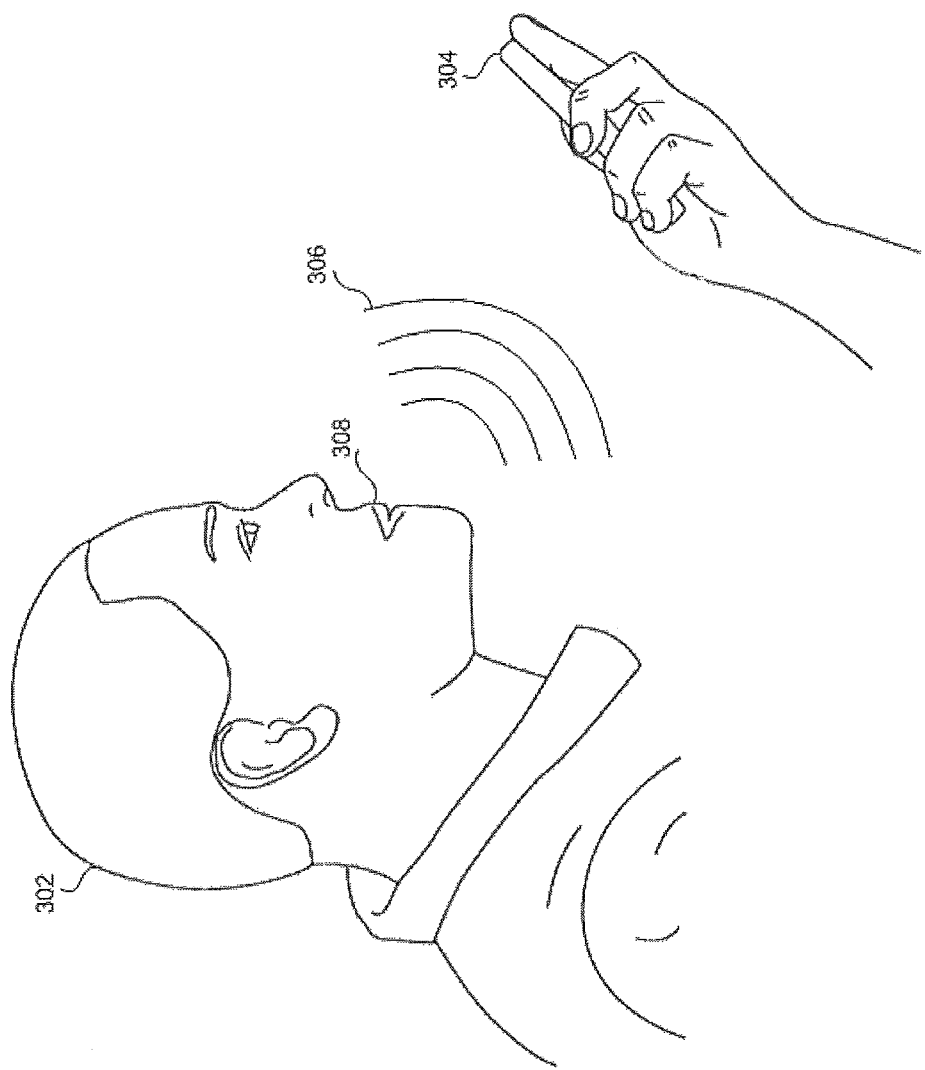

DETECTING AND SWITCHING BETWEEN NOISE REDUCTION MODES IN MULTI-MICROPHONE MOBILE DEVICES

This is the U.S. national stage application No. PCT/CN2013/071841, filed on 25 Feb. 2014, the disclosure of which is incorporated herein by reference.

BACKGROUND OF THE DISCLOSURE

Noise reduction is the process of removing noise from a signal. All recording devices, both analog and digital, have traits which make them susceptible to noise. Noise can be random white noise with no coherence, or coherent noise introduced by the device's mechanism or processing algorithms. When recording or capturing a primary sound source, noise may also be introduced by background sources. These background sources may contribute to an ambient background noise level. The background noise level may typically be of a lesser intensity than the primary sound source; however, the background noise level may include large spikes of noise that significantly interfere with the primary sound source. Additionally, continuous background noise may reduce the quality of the captured or recorded sound from the primary sound source.

Mobile devices may introduce a particular operating environment that is uniquely susceptible to background noise. In many cases, mobile devices may be equipped with two microphones, and the comparison between the voice level recorded by each microphone may be used to remove noise from a recorded or captured voice signal.

SUMMARY

In one embodiment, a method of switching between noise reduction modes in multi-microphone mobile devices may be presented. The method may include receiving a first sound signal at a first sound receiver and receiving a second sound signal at a second sound receiver. The method may also include determining a first power value associated with the first sound signal and determining a second power value associated with the second sound signal. The method may additionally include comparing the first power value to the second power value. The method may further include switching between a single-microphone noise reduction mode and a dual-microphone noise reduction mode based on the comparison.

In another embodiment, a computer-readable memory may be presented. Then computer-readable memory may have stored thereon a sequence of instructions which, when executed by one or more processors, causes the one or more processors to switch between noise reduction modes in multi-microphone mobile devices. The instructions may cause the processor(s) to receive a first sound signal at a first sound receiver and receive a second sound signal at a second sound receiver. The instructions may also cause the processor(s) to determine a first power value associated with the first sound signal and determine a second power value associated with the second sound signal. The instructions may additionally cause the processor(s) to compare the first power value to the second power value. The instructions may further cause the processor(s) to switch between a single-microphone noise reduction mode and a dual-microphone noise reduction mode based on the comparison.

In yet another embodiment, a multi-microphone mobile device that switches between noise reduction modes may be presented. The device may include a first sound receiver that receives a first sound signal and a second sound receiver that receives a second sound signal. The device may also include a signal processing module that is configured to determine a first power value associated with the first sound signal and determine a second power value associated with the second sound signal. The device may further include a noise reduction module that is configured to receive a comparison of the first power value and the second power value and switch between a single-microphone noise reduction mode and a dual-microphone noise reduction mode based on the comparison.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 3A illustrates a view depicting a usage scenario for dual-microphone noise reduction processes, according to one embodiment.

FIG. 3B illustrates a view depicting a usage scenario for single-microphone noise reduction processes, according to one embodiment.

DETAILED DESCRIPTION OF THE DISCLOSURE

Figure 1C:
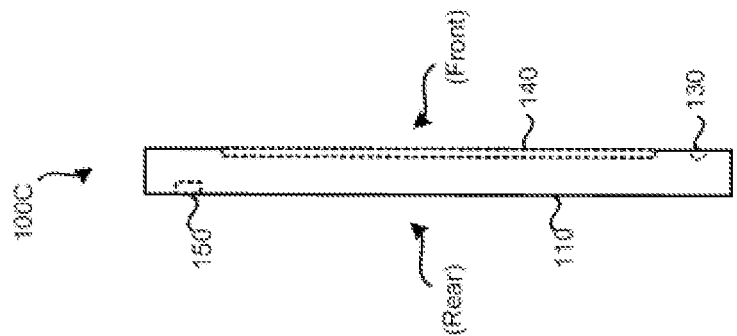
FIGS. 1A-1C illustrate various views of a mobile device supporting multiple sound receivers, according to one embodiment.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Described herein, are embodiments for switching between noise reduction modes. Present mobile devices, such as smart phones, PDAs, and digital voice recorders, can be equipped with a varying number of microphones. Popular smart phones and digital voice recorders usually include at least two microphones. In some cases, a primary microphone may be located on a front side of the mobile device and be intended mainly for handheld communication and voice recording. Another microphone on the back or top of the mobile device may often be used for background noise estimation, noise reduction, echo cancellation, and/or the like. In many situations, a target source, such as a mouth of a user, may be positioned close to the mobile device. In this arrangement, the distance between interfering sources, such as other talkers or ambient noise, and the mobile device is much larger than the distance between the target source and the mobile device. Therefore, the target source may be considered to lie in the near-field of the mobile device.

Sound signals, such as a voice signal, may be represented using spherical waves emanating away from the target source. According to spherical wave propagation theory for near-field acoustic waves, the sound pressure level received by a microphone is inversely proportional to the distance between the microphone and the target source. When a mobile device is equipped with two microphones in different locations, the power levels received by each microphone may include dominant differences, depending on the relative location of the mobile device vis-á-vis the mouth of the user.

In one scenario, a user may make a handheld call or recording where the mobile device is held against the head of the user like a cellular phone. While speaking, the power level received by the primary voice microphone may typically be much higher than that of the reference microphone. This power level difference may be helpful for various known noise reduction techniques. In contrast, a user may also make a call or recording where the mobile device is in a "hands-free" position away from the mouth of the user. In situations such as this, the power level received by the primary microphone may not be much higher than that of the reference microphone. In this case, noise reduction techniques that rely on a dual-microphone configuration may lose their effectiveness. Therefore, it may be desirable to detect such a situation and switch to a single-microphone noise reduction mode in response.

Embodiments discussed herein detected the difference between a signal received by two different sound receivers on a mobile device. When there is voice activity on a primary (or first) microphone, some embodiments may decide whether to switch between dual-microphone mode and single-microphone noise reduction modes in order to produce an optimized output signal using a noise reduction process. Based on the input signals of the primary and reference microphones, the noise reduction mode can be detected according to the present status of voice communications, during which the mode can be switched dynamically and/or automatically.

In this disclosure, sound processing equipment, configurations, and usage scenarios will be described. Next, a general method of using the described hardware will be presented. Finally, a detailed exemplary embodiment will be presented in a non-limiting context.

Figure 1B:
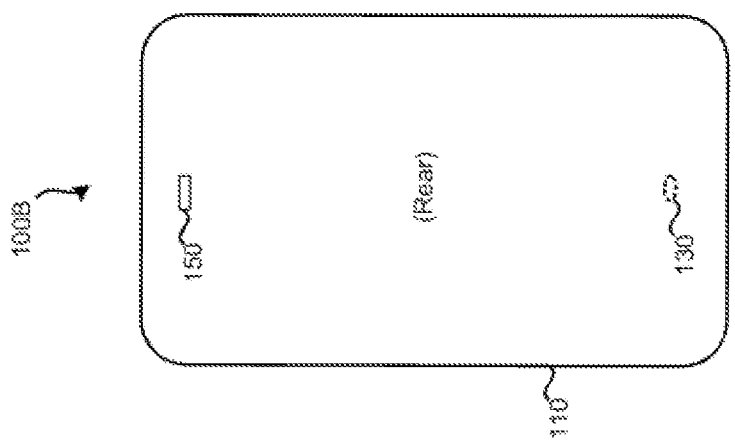
Figure 1A:
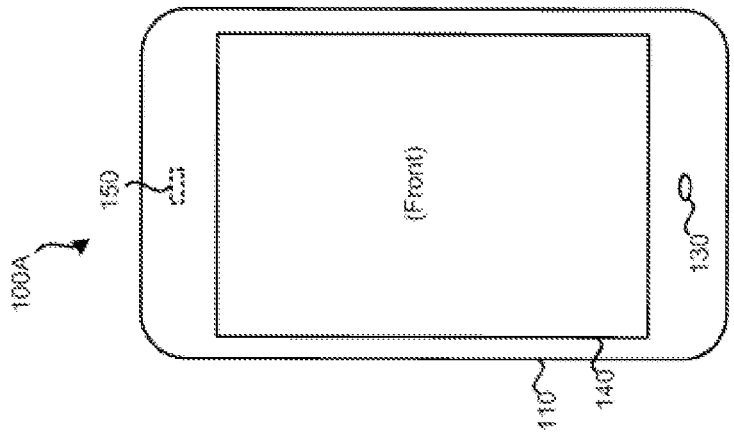

FIG. 1A illustrates an embodiment of a mobile device 100A from a front view and configured to use one or more microphones to select a noise reduction mode. Mobile device 100A may include the sound processing system 200 of FIG. 2 (described below) or some other computer system, such as computer system 700 of FIG. 7 (also described below) configured to receive and/or process an input from one or more microphones. As illustrated, the front of mobile device 100A may include a display 140. Mobile device 100A may also include case 110. Mobile device 100A may also include a first microphone 130. The first microphone 130 may be located on the mobile device 100A in a location configured to receive a sound signal from the mouth of a user. In this particular embodiment, the first microphone 130 can be located near the bottom of the front side of the mobile device 100A. In other embodiments, the first microphone 130 may be located in other locations on the mobile device 100A.

A second microphone 150 may also be included on the mobile device 100A. the second microphone 150 is depicted using a dashed line in order to illustrate that the second microphone 150 may not be visible and/or accessible on the front of the mobile device 100A. In contrast, the first microphone 130 is depicted by a solid line in order to illustrate that the first microphone 130 may be visible and/or accessible on the front of the mobile device 100A. In some embodiments, the "front" of the mobile device 100A may be defined as the side of the mobile device 100A on which the display 140 resides. The front of the mobile device 100A may also be defined as the side of the mobile device 100A that will be closest to a user's mouth when making a phone call.

As used herein, the term "mobile device" may comprise any mobile computing device that may be equipped with a microphone. For example, a mobile device may include a cellular telephone, a smart phone, a digital voice recorder, and/or the like. As used herein, the term "sound receiver" may be used to describe any device capable of receiving a sound signal. For example, a sound receiver may include a microphone or any other type of analog transducer. In some cases, a sound receiver may be configured to receive an analog sound signal and convert the analog sound signal into a digital representation.

FIG. 1B illustrates an embodiment of a mobile device 100B from a rear view and configured to use one or more microphones to select a noise reduction mode. Mobile device 100B may be mobile device 100A of FIG. 1A viewed from a different perspective (e.g., from the rear of mobile device 100A such that display 140 is not visible). Coupled with the rear of case 110 may be one or more additional microphones, such as the second microphone 150. In one embodiment, the second microphone 150 may be positioned on the mobile device 100B such that it can readily receive sound signals representing a background noise level. For example, the second microphone 150 may be located near the top of the rear side of the mobile device 100B. In this location, the second microphone 150 may be less likely to be covered by a user's hand as the mobile device 100B is held against the user's ear. Other locations for the second microphone 150 may also be used in other embodiments.

The two microphones on mobile device 100B are for example purposes only. More or fewer microphones may be present on each side of the mobile device 100B. for example, in one embodiment, the mobile device 100B may be equipped with three or four microphones located in various positions around the mobile device 100B. In these embodiments, multiple microphones may be used to switch between noise reduction modes. These noise reduction modes may use three or four microphones, depending on the particular embodiment.

According to some embodiments, the first microphone 130 and the second microphone 150 may be located "away" from each other on the mobile device 100B. As used herein, this may mean that the first microphone 130 and the second microphone 150 are not accessible through a same opening in the casing 110 of the mobile device 100B. Also, this may mean that the first microphone 130 and the second microphone 150 are located on opposite sides (e.g. top versus bottom, or front versus rear) of the mobile device 100B. Additionally, this may mean that the first microphone 130 and the second microphone 150 are located in positions that will receive a sound from a user's mouth differently when the mobile device 100B is positioned against the user's ear. For example, the first microphone 130 may be located next to a user's mouth, while the second microphone 150 may be located opposite of a user's ear.

FIG. 1C illustrates an embodiment of a mobile device 100C from a side view and configured to use one or more microphones to select a noise reduction mode. Mobile device 100C may be mobile device 100A of FIG. 1A/or and mobile device 100B of FIG. 1B viewed from the side. The first microphone 130 is able to receive sound through an opening in the front side of the mobile device 100C. In contrast, the second microphone 150 is able to receive a sound signal through an opening in the rear of the mobile device 100C.

Typically, when a user holds a mobile device to one of the user's ears, the mobile device is held at an angle. The angle allows a speaker of the mobile device to be near the user's ear while the microphone is near the user's mouth. In this configuration, the first microphone 130 may be positioned near the user's mouth, while the second microphone 150 may be positioned opposite of the user's ear such that the second microphone 150 is not covered by a user's hand.

Figure 2:
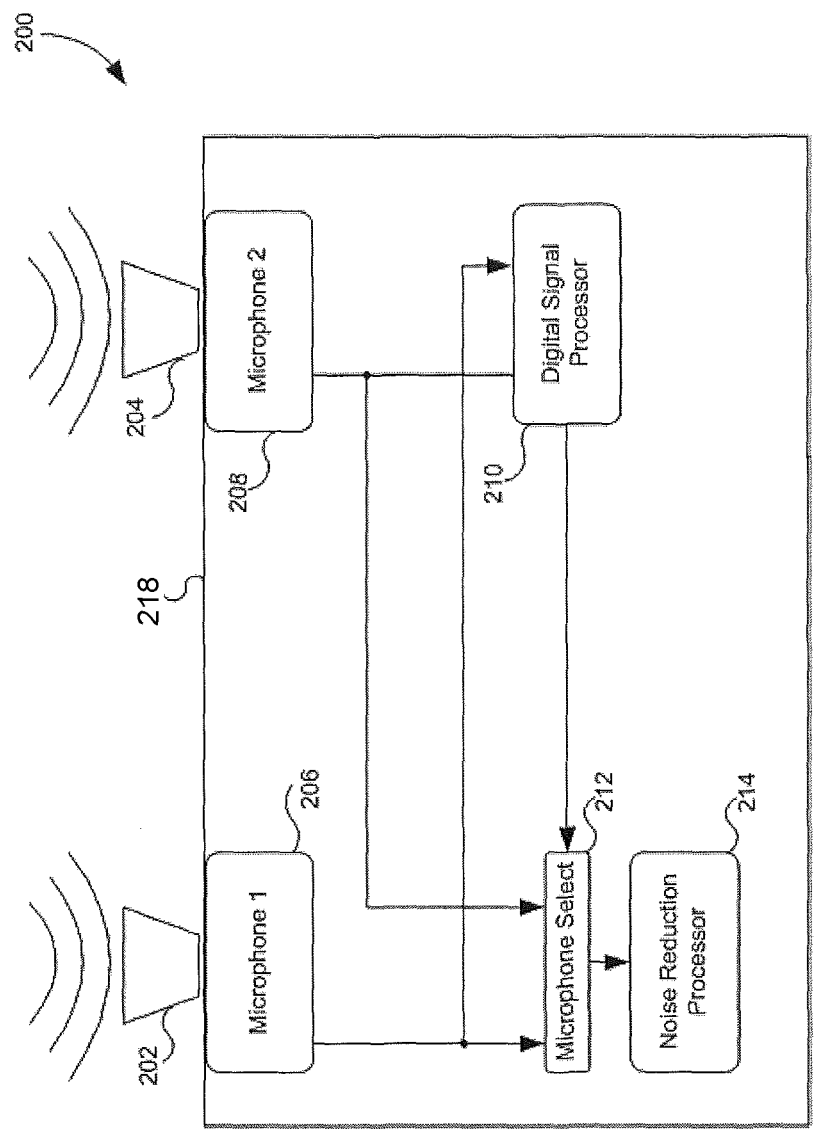
FIG. 2 illustrates a block diagram of a sound processing system for a mobile device, according to one embodiment.

FIG. 2 illustrates a block diagram of a sound processing system 200 for a mobile device, according to one embodiment. The sound processing system 200 may be configured to perform many processing functions in addition to analyzing voice signals for noise reduction mode switching. The system may include a first sound receiver 206 and a second sound receiver 208. In one embodiment, the sound receivers 206, 208 may be implemented using microphones and may be located away from each other on a mobile device 218. The sound receivers 206, 208 may be configured to receive sound waves 202, 204. In one instance, soundwave 202 may primarily represent the voice of a person using the mobile device 218, while soundwave 204 may represent noise from surrounding people and/or objects in addition to the voice of a person using the mobile device 218. Note that in many case, each microphone may receive both noise and voice elements at varying levels.

The sound receivers 206, 208 may be configured to provide a digital/analog representation of the sound waves 202, 204 to a digital signal processor (DSP) 210. The DSP 210 may be implemented using a standalone microchip, including DSP chips available from manufacturers such as Texas Instruments® and Qualcomm® In other embodiments, the DSP 210 may be implemented using software operating on a general purpose microcontroller or microprocessor. The microcontroller or microprocessor may also be programmed to perform different functions in addition to noise reduction mode switching. The DSP 210 may perform various operations on the provided signals in order to determine whether a single microphone should be used for the noise reduction process. The operations that may be performed by the DSP 210 will be discussed further below.

The DSP 210 may provide a signal to a microphone select module 212 that can choose between two noise reduction modes. A first noise reduction mode may use sound receiver 206. A second noise reduction mode may use both sound receiver 206 as well as sound receiver 208. The microphone select module 212 may be used to inform a noise reduction processor 214 of the selected operating mode. Alternatively, the microphone select module 212 may be used to further process the signals provided by the sound receivers 206, 208 before being passed to the noise reduction processor 214. In one embodiment, the microphone select module 212 may be combined with the noise reduction processor 214. The noise reduction processor 214 may be a stand-alone microprocessor or microcontroller, and may be programmed to perform additional functions in addition to noise reduction. In one embodiment, the DSP 210 and the noise reduction processor 214 are integrated into a single microprocessor chip.

In one embodiment, the various modules and systems in FIG. 2 may reside on separate hardware elements of the mobile device 218. Alternatively, multiple modules may be combined on the same or similar hardware elements. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

FIG. 3A illustrates a view depicting a usage scenario for dual-microphone noise reduction processes, according to one embodiment. In this scenario, a user 302 may be holding a mobile device 304 against the ear of the user 302. In this particular example, the mobile device 304 comprises a smart phone. In other embodiments, the mobile device 304 may include other devices as described above. A first sound receiver (not shown) may be located on the mobile device 304 near the mouth of the user 302. In this location, the first sound receiver may receive a voice signal of the user 302 that is associated with a higher received power level. The higher received power level may be based on the first sound receiver's proximity to the mouth of the user 302, as well as a reflection effect by the mobile device 304 and/or the hand of the user 302.

A second sound receiver may be located on a rear side of the mobile device 304 that is opposite of the first sound receiver. In this embodiment, the second sound receiver is located opposite of the ear of the user 302 on the rear of the phone opposite of a display (not shown). In this location, the second sound receiver may also receive a voice signal of the user 302; however, the voice signal may be associated with a lower received power level. The lower received power level may be based on the second sound receiver's relative distance to the mouth of the user 302, as well as a shielding effect by the mobile device 304 and/or the hand of the user 302.

According to this embodiment, the mobile device 304 may determine that the power levels received by the first sound receiver and the second sound receiver differ by at least a threshold amount. According to this determination, a processor within the mobile device 304 may determine that both the first sound receiver and the second sound receiver may be used by a noise reduction process.

FIG. 3B illustrates a view depicting a usage scenario for single-microphone noise reduction processes, according to one embodiment. In this scenario, a user 302 may be using a mobile device 304 in a hands-free mode. This may include using a smart phone in speaker mode where the smart phone is above a predetermined threshold distance from the mouth 308 of the user 302. For example, the mobile device 304 may be 6 inches, 12 inches, 24 inches, or 36 inches away from the mouth 308 of the user 302. The sound signal 306 emanating from the mouth 308 of the user 302 may be modeled using a spherical wave propagation model.

In this scenario, the sound signal 306 may be attenuated during propagation such that a power level received at a first sound receiver is similar to a power level received at a second sound receiver. For example, a microphone on the front side of the mobile device 304 may receive a signal with a power level that is similar to a power level received by microphone on the rear side of the mobile device 304. The power levels may be considered similar if they are within a particular threshold amount of each other.

Figure 4:
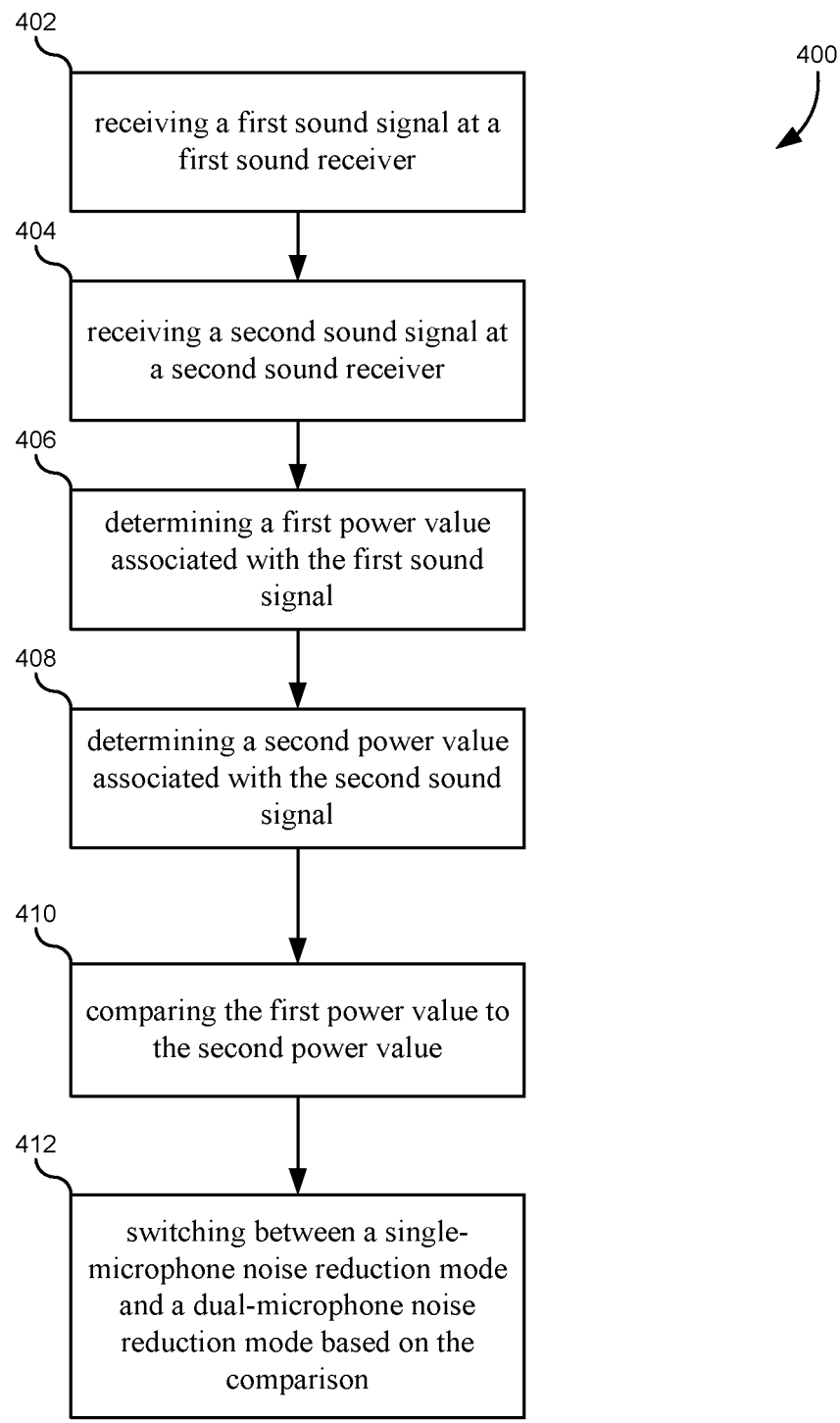
FIG. 4 illustrates a flowchart of a method for switching between noise reduction modes, according to one embodiment.

FIG. 4 illustrates a flowchart 400 of a method for switching between noise reduction modes, according to one embodiment. The method may include receiving a first sound signal at a first sound receiver (402). The first sound signal may represent the voice of a user as received by a primary microphone on a mobile device. The mobile device may include a smart phone, a digital voice recorder, a PDA, a noise-canceling microphone system and/or the like. The first sound receiver may be placed on a mobile device such that it is near the mouth of a user when a call is being made or a voice is being recorded.

The method may also include receiving a second sound signal at a second sound receiver (404). The second sound receiver may be located on a mobile device such that it is configured to receive a lower power signal resulting from the voice of a user compared to the first sound receiver when the mobile device is positioned near the mouth of the user. In one embodiment, the second sound receiver may be located away from the first sound receiver on the mobile device. In one embodiment, the second sound receiver may be located on a top rear portion of the mobile device, while the first sound receiver may be located on a bottom front portion of the mobile device.

The method may also include determining a first power value associated with the first sound signal (406). Similarly, the method may include determining a second power value associated with the second sound signal (408). In some embodiments, the received sound signals may be preprocessed. The preprocessing may include overlapping, windowing, and/or transforming each of the received sound signals. In one embodiment, a power spectral density (PSD) for each channel can be computed.

The method may further include comparing a value associated with the first power level to a value associated with the second power level (410). As used herein, a "power value" may include any value derived from the received sound signals that is dependent upon the power levels of the received sound signals. In some embodiments, the value may simply include a raw power measurement recorded by microphone. In some embodiments, the value may include a value based on a transformation of the received sound signals, such as a Discrete Fourier Transform (DFT) or a Fast Fourier Transform (FFT) value. To compare the values, a normalized difference of the power spectral density (ND-PSD) between the two received sound signals may be computed. The ND-PSD may then be average by crossing frequency bands to obtain a mean ND-PSD (MND-PSD) that shows the voice activity status and channel difference status of a present sound frame.

The method may also include switching between a single-microphone noise reduction mode and a dual-microphone noise reduction mode based on the comparison (412). In one embodiment, the voice activity probability and channel different probability within a time block, or window, may be analyzed to determine the optimal noise reduction mode. Whether to switch noise reduction modes may depend on the comparison between the optimal mode and the present mode. In some embodiments, this may include determining that the first power level is within a threshold amount of the second power level, and switching to the single-microphone noise reduction mode. Alternatively, this step may include determining that the first power level is greater than the second power level by at least a threshold amount, and switching to the dual-microphone noise reduction mode.

Figure 5:
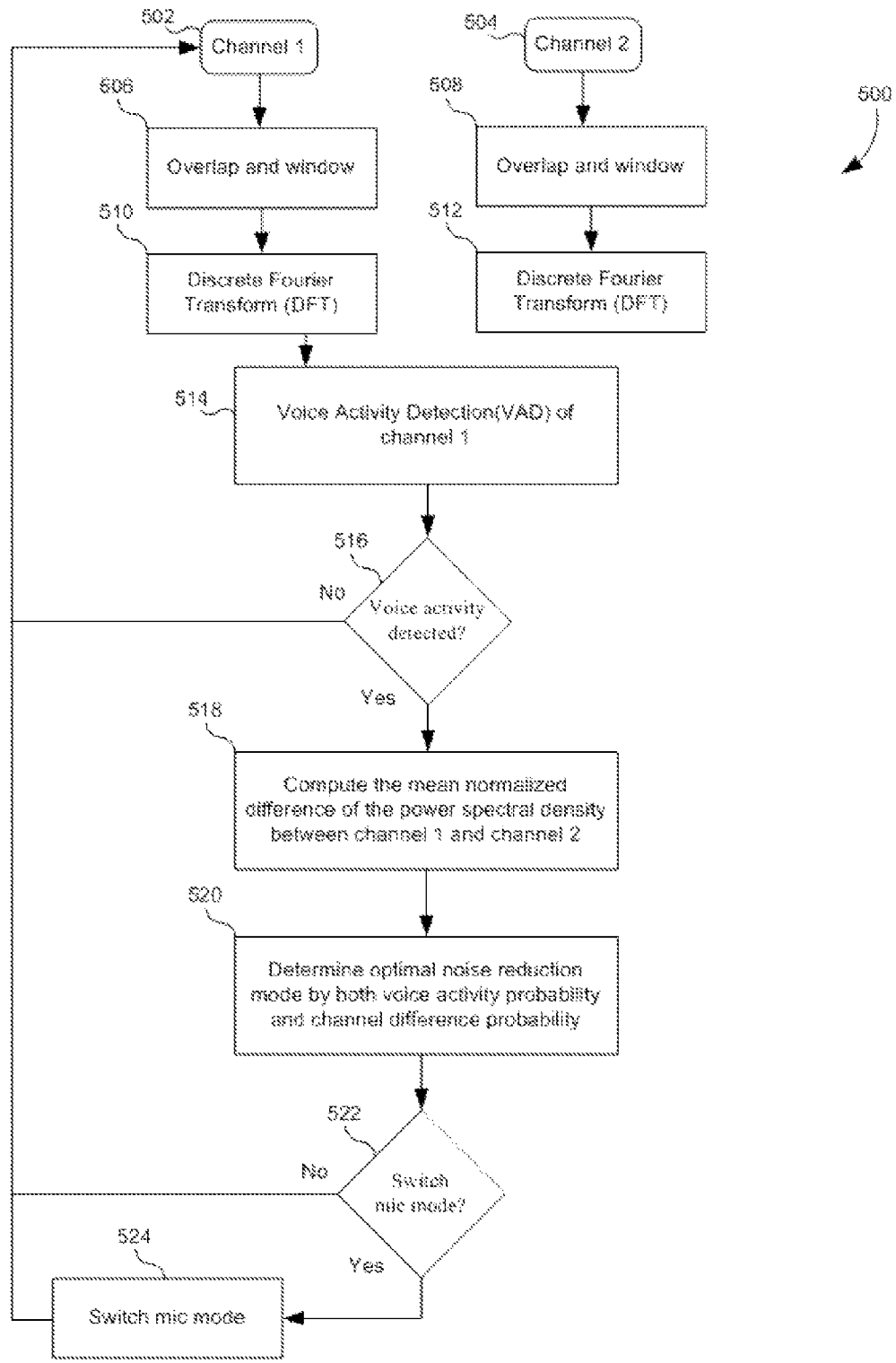
FIG. 5 illustrates a flowchart of another method for switching between noise reduction modes, according to one embodiment.

FIG. 5 illustrates a flowchart 500 of another method for switching between noise reduction modes, according to one embodiment. This method may be a specific embodiment of the method discussed in relation to FIG. 4. The method may include receiving analog sound signals at a first microphone and a second microphone and converting the analog sound signals into discrete-time sound signals, referred to herein as "Channel 1" and "Channel 2" (502, 504). Channel 1 and Channel 2 may be described as the discrete time series functions $x_1(m)$ and $x_2(m)$, respectively.

The signals $x_1(m)$ and $x_2(m)$ may undergo an overlapping and/or windowing process (506, 508). The windowed signals can then be transformed to the frequency domain using a DFT process (510, 512). The discrete frequency spectrum of n-th frames for $x_1(m)$ and $x_2(m)$ may be represented by $X_1(n, k)$ and $X_2(n, k)$ and defined as:

$$X_1(n, k) = \sum_{m=-\infty}^{+\infty} x_1(m) w(nR - m) e^{-j2\pi km/N} \qquad (1)$$

$$X_2(n, k) = \sum_{m=-\infty}^{+\infty} x_2(m) w(nR - m) e^{-j2\pi km/N} \qquad (2)$$

where R represents the updated samples for each frame, N is DFT number, k is the number or order of the frequency bins for the transform, and w(m) is a windowing function. The type of window function may include any windows used for speech signal processing. For example, window functions may include a rectangular window, a Hanning window, a Hamming window, a Tukey window, a cosine window, a triangular window, a Gaussian window, and/or the like. The frame length may selected to be any value. In one embodiment, the frame length may be between 10-30 ms and a typical value may be 20 ms, 15 ms, or 25 ms.

In some embodiments, the DFT can also be implemented using a Fast Fourier Transform (FFT). The FFT can be directly used after windowing. Zero padding may also be used to increase the order or number of frequency bins. In some embodiments, the sample rate $F_s$ for the FFT may be 16 kHz, the window may be a Hamming function, the frame length may be 20 ms, and the frame overlap may be 50%. This particular configuration may result in 320 samples for each frame with updating samples R=160. Then, after zero padding to 512 samples, 512 frequency bins may be computed. It will be understood that this particular implementation is merely exemplary and not meant to be limiting.

As part of the preprocessing, the method may also include calculating a power spectral density (PSD) for each of the two channels. For each frame, the PSD for each channel may be computed by the present frame's spectrum and the last frame's PSD, and given by:

$$P_{X_1X_1}(n,k)=\alpha_1 \cdot P_{X_1X_1}(n-1,k)+(1-\alpha_1)\cdot |X_1(n,k)|^2 \qquad (3)$$

$$P_{X_2X_2}(n,k)=\alpha_2 \cdot P_{X_2X_2}(n-1,k)+(1-\alpha_2)\cdot |X_2(n,k)|^2 \qquad (4)$$

where $P_{X_1X_1}(n, k)$ is PSD of Channel 1, $P_{X_2X_2}(n, k)$ is PSD of Channel 2, $\alpha_1$ and $\alpha_2$ are smoothing factor for Channel 1 and Channel 2, and |*| is an operator computing the modulus of a complex number. In one embodiment, the ranges of $\alpha_1$ and $\alpha_2$ may be approximately 0.5-0.95. In one embodiment, the value for $\alpha_1$ and $\alpha_2$ is 0.8.

Next, the method may include determining whether voice activity is detected on Channel 1, where Channel 1 represents a primary microphone, or first sound receiver signal (514). In some embodiments, the Voice Activity Detection (VAD) of the primary microphone (Channel 1) may analyzed to determine whether the signal represents a speech frame (e.g. the user is talking) or a noise frame (e.g. the user is not talking). VAD algorithms that are based on energy levels and zeros-crossings, cepstral features, the Itakura LPC spectral distance measure, and/or the periodicity measure may be used. These algorithms are known in the art, and could be selected by one having skill in the art in light of this disclosure.

The method may next include comparing the VAD value to a threshold value to determine whether the present frame is speech or another type of noise (516). In some embodiments, a noise estimation algorithm based on Doblinger noise estimation may be chosen to detect voice activity. In other embodiments, other single-channel and/or multi-channel VAD algorithms can also be used.

In one embodiment, the VAD algorithm based on Doblinger noise estimation may be designed to include at least two steps. First, the noise PSD may be updated by the present frame's signal PSD and last frame's noise PSD. For example, if $P_{N_1N_1}(n-1,k)<P_{X_1X_1}(n, k)$, then the present frame's noise PSD can be updated as:

$$P_{N_1N_1}(n, k) = \qquad (5)$$
$$\gamma P_{N_1N_1}(n-1, k) + \frac{1-\gamma}{1-\beta}(P_{X_1X_1}(n, k) - \beta \cdot P_{X_1X_1}(n-1, k)).$$

Otherwise, the present frame's noise PSD can be updated as:

$$P_{N_1N_1}(n,k)=P_{X_1X_1}(n,k) \qquad (6)$$

Second, the mean posteriori signal-to-noise ratio is estimated as:

$$SNR(n) = \sum_{k=L_1}^{L_2} P_{X_1X_1}(n, k) \bigg/ \sum_{k=L_1}^{L_2} P_{N_1N_1}(n, k) \qquad (7)$$

If $SNR(n)>Threshold_1$, then the present frame may be considered to be a speech frame, and it may be represented by VAD(n)=1. Otherwise, the present frame may be considered a noise frame, and it may be represented as VAD (n)=0. In one embodiment, a typical value of β may be 0.96 and a typical value of γ may be 0.998. $L_1$ and $L_2$ may be chosen within a frequency band where speech energy is dominant. For example, when the sample rate $F_s$ is 16 kHz, the FFT length is N=512, and the frequency range is 200-3500 Hz, then the value $L_1$ may be selected as $$L_1 = \text{floor}\left(\frac{200}{F_S/N}\right) = 6$$

and the value of $L_2$ may be selected as $$L_2 = \text{floor}\left(\frac{3500}{F_S/N}\right) = 112.$$

In one embodiment, the range of threshold $Threshold_1$ may be selected as any value in the range of 3-10. In one embodiment, the threshold value may be 5.

The method may also include computing the mean normalized difference of the power spectral density between Channel 1 and Channel 2 (518). In some embodiments, if the present frame is a speech frame, then the channel difference may be compared. For example, the normalized difference of the power spectral density (ND-PSD) between two channels may be calculated as:

$$\Delta\Phi(n, k) = \left|\frac{P_{X_1X_1}(n, k) - P_{X_2X_2}(n, k)}{P_{X_1X_1}(n, k) + P_{X_2X_2}(n, k)}\right| \qquad (8)$$

In some embodiments, the method may also average the computed value of $\Delta\Phi(n, k)$ for each $n^{th}$ frame. The mean normalized difference of the power spectral density $\Delta\Phi(n)$ may then be represented by:

$$\Delta\Phi(n) = \frac{1}{L_4 - L_3 + 1} \sum_{k=L_3}^{L_4} \Delta\Phi(n, k) \qquad (9)$$

In some embodiments, if $\Delta\Phi(n)>Threshold_2$, then a channel difference factor may be defined as DIF(n)=1. Otherwise the channel difference factor may be defined as DIF(n)=0. $L_3$ and $L_4$ may be chosen to fall within a frequency band where speech is dominant. For example, when the sample rate $F_s$ is 16 kHz, the FFT length is N=512, and the frequency range is 200-3500 Hz, then the value of $L_3$ may be selected as $$L_3 = \text{floor}\left(\frac{200}{F_S/N}\right) = 6$$

and the value of $L_4$ may be selected as $$L_4 = \text{floor}\left(\frac{3500}{F_S/N}\right) = 112.$$

In one embodiment, the range of threshold Threshold$_2$ may be selected from within the range of 0.4-0.7. In one embodiment, the value of Threshold$_2$ may be 0.50.

The method may additionally include determining an optimal noise reduction mode using voice activity probability and/or channel difference probability (520). In many cases, the communication status of a target talker and the layout position of mobile devices usually is unlikely to change over a short time period, and the mode can be determined within this short time period to reduce the error rate. In one embodiment, a time block T can be used as an updating block. If the mode in t-th time block is determined to be a single-microphone mode, it can written as Mode(t)=1, whereas if the mode in the t-th time block is determined to be a dual-microphone mode, it can be written as Mode(t)=0. The voice activity probability in t-th time block $P_{VAD}(t)$ can be written as:

$$P_{VAD}(t) = \frac{1}{T}\sum_{T} VAD(n) \quad (10)$$

If $P_{VAD}(t)$>Threshold$_3$, the voice activity may be considered to be relatively long in the present time block. If the Threshold$_3$ is not met, then the voice activity may be considered to be relatively short, and the mode of the present time block may be maintained through to the next time block (i.e., Mode(t+1)=Mode(t)).

The method may also include determining whether to switch the noise reduction mode (522), and switching the microphone mode if necessary (524). When sufficient voice activity has been detected, (when $P_{VAD}(t)$>Threshold$_3$), the channel difference probability $P_{DIF}(t)$ may be calculated by:

$$P_{DIF}(t) = \sum_{VAD} DIF(n) \Big/ \sum_{T} VAD(n) \quad (11)$$

If $P_{DIF}(t)$<Threshold$_4$, then the channel difference may be considered to be relatively small, and the mode of next time block may be selected to use a single-microphone noise reduction mode (i.e., Mode(t+1)=1). Otherwise, if $P_{DIF}(t)$ ≥Threshold$_4$, then the channel difference may be considered to be relatively large, and the next time block mode may be selected to use a dual-microphone noise reduction mode (i.e., Mode(t+1)=0). After the mode of next time block has been determined, the mode Mode(t+1) may be compared to the present mode Mode(t). If they are the same, the present mode may simply be maintained; otherwise, the present mode may be changed.

In one embodiment, the method of switching noise reduction modes described above may be smoothed between the present mode and next mode, such that the present mode is gradually reduced and next mode is gradually increased. The current mode may also be switched at the time when the voice activity is not detected. Other methods may also be used that maintain a predetermined level of speech quality. For example, the switching may take place at a time when voice activity is not detected. In one embodiment, the mode may be switched when several continuous noise frames (e.g. non-speech frames) have been detected. For example, the number of noise frames may be more than 5. In one embodiment, when the sample rate $F_s$ is 16 kH and frame length is 20 ms, then 10 noise frames may be detected before switching. The time block T may be determined by both the updating rate of the noise reduction mode and detection accuracy. For example, the range of T=1-10 s may be used with a typical value of 2 s. According to some studies, a normal speech rate may be approximately 4 words per second, or about 0.25 seconds/word. Therefore, in one embodiment, the range of threshold Threshold$_3$ may be $$\text{floor}\left(\frac{0.25}{T}\right) \le Threshold_3 < 1,$$

with its typical value of floor $$\left(\frac{0.5}{T}\right).$$

This threshold would yield at least 2 words in each time block. In some embodiments, T may be 2 s, the threshold Threshold$_3$ may be 0.25, and/or the range of threshold Threshold$_4$ may be 0.1-0.4 with a typical value of 0.20.

It should be appreciated that the specific steps illustrated in FIGS. 4-5 provide particular methods of switching between noise reduction modes according to various embodiments of the present invention. Other sequences of steps may also be performed according to alternative embodiments. For example, alternative embodiments of the present invention may perform the steps outlined above in a different order. Moreover, the individual steps illustrated in FIGS. 4-5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
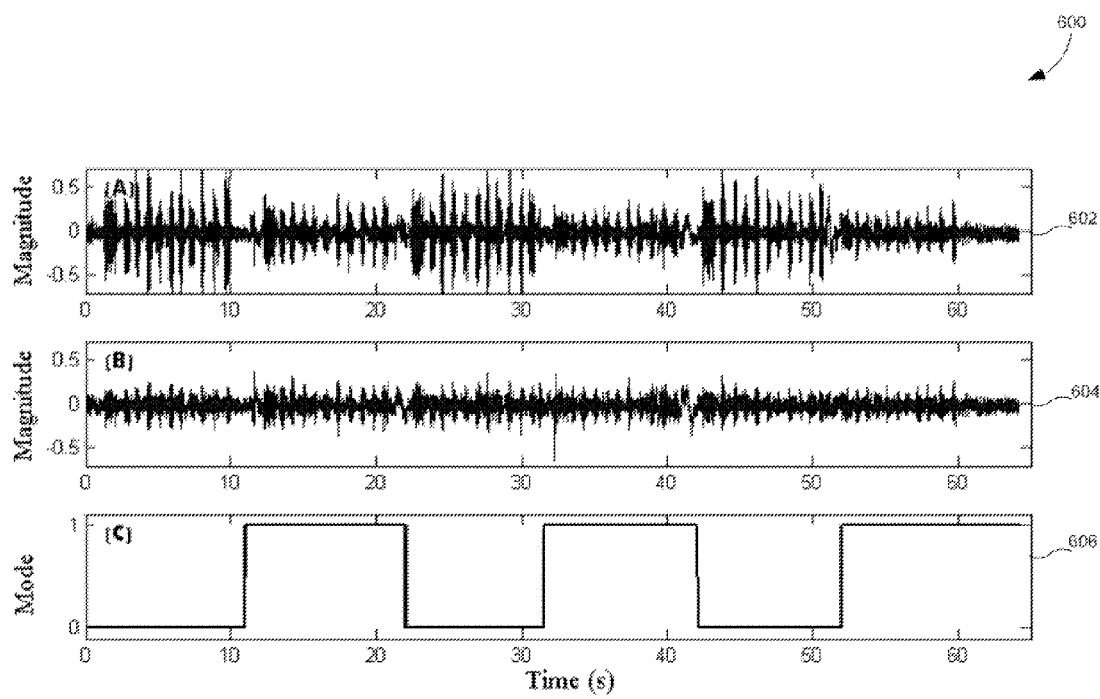
FIG. 6 illustrates a graph of power levels and noise reduction modes, according to one embodiment.

FIG. 6 illustrates a graph 600 of power levels and noise reduction modes, according to one embodiment. The sound signals depicted in graph 600 were recorded by a prototype mobile device. The prototype mobile device was designed to use two microphones. The primary microphone was located at the front and bottom of the prototype mobile device, and the reference microphone was located at the back and top of the prototype mobile device as depicted in FIGS. 1A-1C. A signal acquiring system including two sound receivers was used to record the signals. The sample rate was 16 kHz and the sample precision was 16 bit. In a large-size open-plan office with background noise, a target talker was speaking between hand-held and hand-free, and the switching period was about 10 s. The resulting time domain signals are shown in the graph 600. Signal 602 represented the signal of the primary, or first microphone (Channel 1), and signal 604 represents the signal of the reference, or second microphone (Channel 2). The x-axis represents time and the y-axis represents magnitude. Signal 606 represents the resulting noise reduction mode that was processed and selected using the embodiments described herein. In signal 600, '0' represents a dual-microphone mode and '1' represents a single-microphone mode.

The parameters used for processing were as follows. A hamming window was used with a frame length of 20 ms, an overlap of 50%, zero padding to N=512 FFT, smoothing factors $\alpha_1$=0.8 and $\alpha_2$=0.8, $L_1$=6, $L_2$=112, Threshold$_1$=5, $L_3$=6, $L_4$=112, Threshold$_2$=0.5, T=2s, Threshold$_3$=0.25, and Threshold$_4$=0.2. The noise reduction mode was switched when voice activity was not sufficiently detected. Only when 10 consecutive noise frames were detected was the mode switched for the next noise frame. In the results shown in graph 600, the mode detection corresponded to the practical recording status. The speech quality was not influenced when the mode was switched during the noise frame. Graph 600 illustrates that these embodiments were able to detect the present noise reduction mode and switch the mode without significantly affecting the quality of speech.

Figure 7:
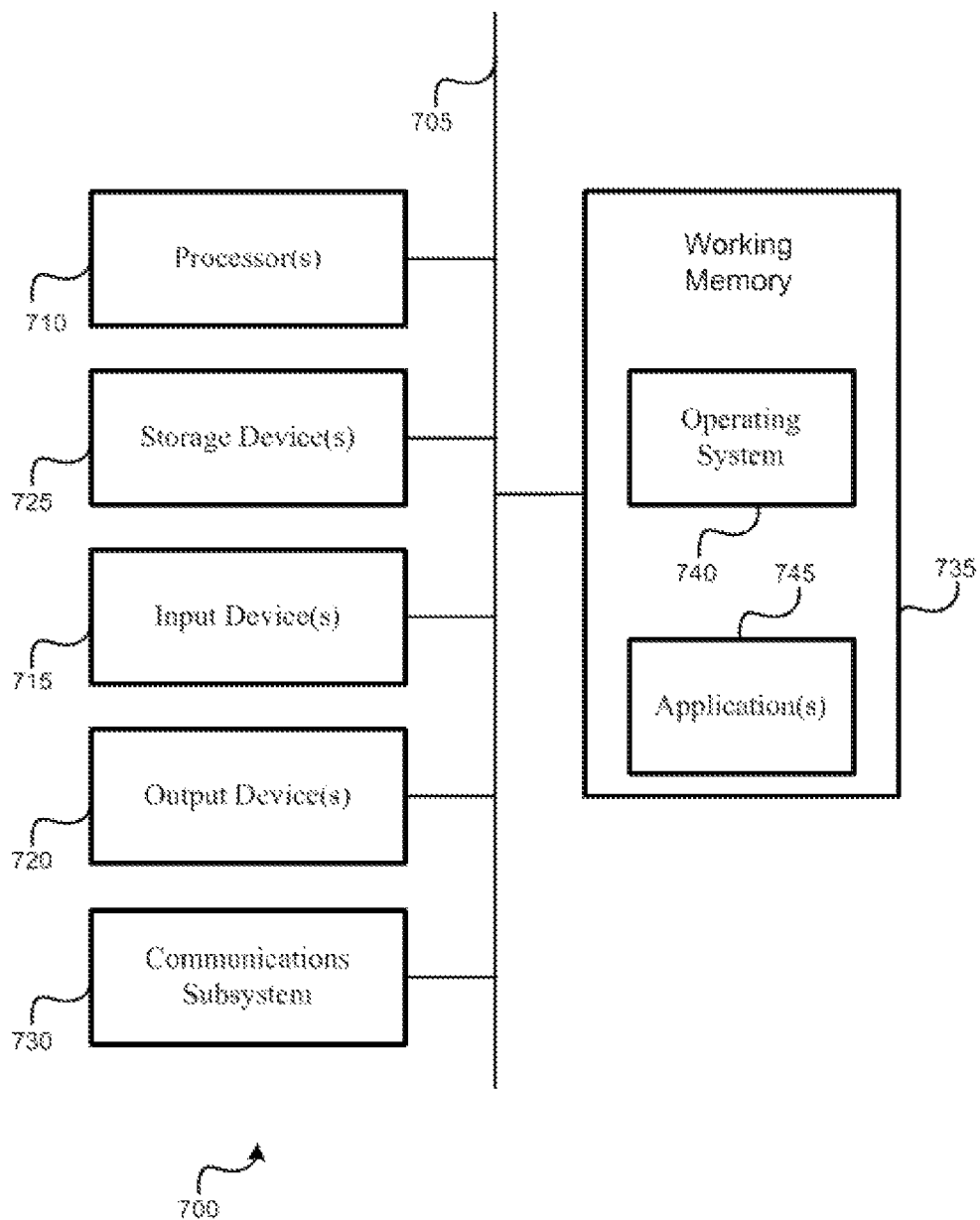
FIG. 7 illustrates a block diagram of an exemplary computer hardware system that may be used to implement various embodiments.

FIG. 7 illustrates a block diagram of an exemplary computer system 700 that may be used to implement various embodiments. Some embodiments may employ a computer system (such as the computer system 700) to perform methods in accordance with various embodiments of the invention. The computer system may be implemented using various circuits, microchips, and connections within a mobile device. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Computer system 700 may also include input device(s) 715 and output device(s) 720.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of switching between noise reduction modes in multi-microphone mobile devices, the method comprising:
receiving a first sound signal at a first sound receiver;
receiving a second sound signal at a second sound receiver;
determining a first power value associated with the first sound signal comprising a power spectral density associated with the first sound signal;
determining a second power value associated with the second sound signal comprising a power spectral density associated with the second sound signal;
dividing the first sound signal into first discrete time frames;
comparing the first power value to the second power value; and
switching between a single-microphone noise reduction mode and a dual-microphone noise reduction mode based on the comparison;
wherein the switching between the single-microphone noise reduction mode and the dual-microphone noise reduction mode is further based on a comparison of a number of consecutive first discrete time frames during which voice activity is not detected to a selected value, and
wherein the power spectral density for each first and second sound signal is computed by a present frame's spectrum and a last frame's power spectral density.

2. The method of claim 1 wherein the first sound receiver is located away from the second sound receiver on a mobile device.

3. The method of claim 2 wherein the first sound receiver is located on a front side of the mobile device, and the second sound receiver is located on a back side of the mobile device.

4. The method of claim 1 further comprising:
determining that a difference between the first power level and the second power level is less than or equal to a threshold amount; and
switching to the single-microphone noise reduction mode.

5. The method of claim 1 further comprising:
determining that the first power level is greater than the second power level by at least a threshold amount; and
switching to the dual-microphone noise reduction mode.

6. The method of claim 1 further comprising:
dividing the second sound signal into second discrete time frames;
performing a Fourier transform on the first discrete time frames; and
performing a Fourier transform on the second discrete time frames.

7. The method of claim 1 wherein the step of comparing the first power value to the second power value comprises computing a mean normalized difference between the power spectral density associated with the first sound signal and the power spectral density associated with the second sound signal.

8. The method of claim 1 further comprising detecting voice activity in the first sound signal.

9. A multi-microphone mobile device that switches between noise reduction modes, the device comprising:
a first sound receiver structured to receive a first sound signal comprising a power spectral density associated with the first sound signal;
a second sound receiver structured to receive a second sound signal comprising a power spectral density associated with the second sound signal;
a signal processing module structured to:
determine a first power value associated with the first sound signal;
determine a second power value associated with the second sound signal;
divide the first sound signal into first discrete time frames; and
a noise reduction module structured to:
receive a comparison of the first power value and the second power value; and
switch between a single-microphone noise reduction mode and a dual-microphone noise reduction mode based on the comparison;
wherein the noise reduction module is structured such that switching between the single-microphone noise reduction mode and the dual-microphone noise reduction mode is further based on a comparison of a number of consecutive first discrete time frames during which voice activity is not detected to a selected value,
wherein the power spectral density for each first and second sound signal is computed by a present frame's spectrum and a last frame's power spectral density.

10. The device of claim 9 wherein the signal processing module and the noise reduction module are part of a Digital Signal Processing (DSP) chip.

11. The device of claim 9 wherein the multi-microphone mobile device comprises a smart phone.

12. The device of claim 9 wherein:
the signal processing module is further configured to determine that a difference between the first power level and the second power level is less than or equal to a threshold amount; and
the noise reduction module is further configured to switch to the single-microphone noise reduction mode.

13. The device of claim 9 wherein:
the signal processing module is further configured to determine that the first power level is greater than the second power level by at least a threshold amount; and
the noise reduction module is further configured to switch to the dual-microphone noise reduction mode.

14. The device of claim 9 wherein the signal processing module is further configured to:
divide the second sound signal into second discrete time frames;
perform a Fourier transform on the first discrete time frames; and
perform a Fourier transform on the second discrete time frames.

15. A non-transitory computer-readable medium on which is stored a sequence of instructions which, when executed by one or more processors, causes the one or more processors to perform:
receiving a first sound signal at a first sound receiver;
receiving a second sound signal at a second sound receiver;
determining a first power value associated with the first sound signal comprising a power spectral density associated with the first sound signal;
determining a second power value associated with the second sound signal comprising a power spectral density associated with the second sound signal;

dividing the first sound signal into first discrete time frames;

comparing the first power value to the second power value; and switching between a single-microphone noise reduction mode and a dual-microphone noise reduction mode based on the comparison; and wherein the switching between the single-microphone noise reduction mode and the dual-microphone noise reduction mode is further based on a comparison of a number of consecutive first discrete time frames during which voice activity is not detected to a selected value, and wherein the power spectral density for each first and second sound signal is computed by a present frame's spectrum and a last frame's power spectral density.

16. The computer-readable memory according to claim 15, wherein the instructions further cause the one or more processors to switch between noise reduction modes in multi-microphone mobile devices by:

determining that a difference between the first power level and the second power level is less than or equal to a threshold amount; and switching to the single-microphone noise reduction mode.

17. The computer-readable memory according to claim 15, wherein the instructions further cause the one or more processors to switch between noise reduction modes in multi-microphone mobile devices by:

determining that the first power level is greater than the second power level by at least a threshold amount; and switching to the dual-microphone noise reduction mode.

* * * * *